United States Patent [19]

Phillips

[11] 3,998,315

[45] Dec. 21, 1976

[54] ROTOR STRUCTURE FOR ROTARY ELECTRICAL PRINTER

[75] Inventor: Darwin E. Phillips, Huntsville, Ala.

[73] Assignee: SCI Systems, Inc., Huntsville, Ala.

[22] Filed: Feb. 2, 1976

[21] Appl. No.: 654,281

[52] U.S. Cl. .......... 197/1 R; 101/93.04; 346/165; 74/531; 403/404

[51] Int. Cl.[2] .......... G01D 15/18

[58] Field of Search .......... 101/93.04, 93.18, 93.19; 197/1 R, 148–155; 346/76 R, 78, 79, 74 R, 74 ES, 74 E, 75; 74/531; 403/404

[56] References Cited

UNITED STATES PATENTS

| | | | |
|---|---|---|---|
| 2,881,044 | 4/1959 | Eisler et al. | 346/74 E X |
| 2,910,339 | 10/1959 | Eisler et al. | 346/74 E X |
| 3,161,457 | 12/1964 | Schroeder et al. | 101/93.04 X |
| 3,807,301 | 4/1974 | Decker | 197/49 X |
| 3,814,229 | 6/1974 | Kohlhage | 197/49 X |
| 3,845,850 | 11/1974 | Herr et al. | 101/93.04 X |
| 3,864,696 | 2/1975 | Fischbeck | 197/1 R X |
| 3,907,091 | 9/1975 | Meier et al. | 197/53 |
| 3,911,812 | 10/1975 | Flynn et al. | 197/1 R X |
| 3,921,780 | 11/1975 | Gentzlinger et al. | 197/1 R |
| 3,925,790 | 12/1975 | Fischbeck | 197/1 R X |

*Primary Examiner*—E. H. Eickholt
*Attorney, Agent, or Firm*—Curtis, Morris & Safford

[57] ABSTRACT

The printer records images in the form of dots on electrical discharge-sensitive paper. Three groups of five styli are mounted on a rotor. The paper is in strip form and is fed continuously through a curved guide in a direction perpendicular to the plane of rotation of the rotor, so that the paper is wrapped part way around the rotor as it moves past. Characters are formed from a five dot by seven dot matrix. This invention provides means for automatically retracting the styli away from the paper when the rotational speed of the rotor drops below a pre-determined minimum level and, of course, when the rotor stops. This facilitates removal of the rotor from the printer, and also facilitates feeding a new strip of paper into the printer. Means also are provided for adjusting the axial position of each group of styli merely by turning one or more screws. The screws are easily accessible without removing the rotor. Simple screw adjustment means also are provided for adjusting the radial extent of the styli to compensate for wear of the styli, and align the characters produced by the printer. Means also are provided for easily removing and replacing the rotor in the printer, thus facilitating repairs or adjustments.

19 Claims, 6 Drawing Figures

ROTOR STRUCTURE FOR ROTARY ELECTRICAL PRINTER

This invention relates to image recording and printing, and particularly to rotary printing. In its preferred embodiment, the invention is disclosed in use in a rotary printer of the type in which images are formed by electrical discharges selectively positioned on discharge-sensitive paper. This invention is an improvement upon the printer disclosed in U.S. patent application Ser. No. 611,785 filed Sept. 9, 1975 in the name of Olin B. King. The disclosure of that patent application hereby is incorporated herein by reference.

The printer of the above-indentified prior patent application has a rotor and a plurality of electrically actuatable print members or styli secured to the rotor. Drive means are provided for rotating the rotor to move the styli across a record surface. Preferably, the record surface has the form of a strip of electrical discharge-sensitive paper which is wrapped part-way around the rotor when making contact with the print members. The paper strip is moved transversely across the rotor in a direction perpendicular to the plane of rotation of the rotor.

The styli used in such a printer preferably are thin, resilient wires which bear against the paper during the printing operation. While the operation of that printer is fast, smooth and efficient, and it is economical to build, it has been found that the styli, because they engage the paper, sometimes cause undesirable interference between the paper and the rotor when it is desired to remove the rotor from the printer for servicing or adjustment. Furthermore, when feeding a new strip of paper through the printer, snagging can be caused by the engagement between the styli and the paper.

In accordance with the present invention, the foregoing problems are solved by providing a mechanism which automatically retracts the styli away from the paper when the rotor speed drops below a pre-determined minimum. Preferably, the styli are retracted by means of springs. The styli are caused to automatically engage the recording paper when the rotor attains the desired minimum speed by means of centrifugal forces which act against the springs and hold the styli in contact with the paper.

The invention also provides a simple and economical adjustment mechanism for adjusting the axial positions of the styli. Furthermore, another simple mechanical structure is provided for adjusting the radial extent of the styli so as to compensate for wear, and for alignment purposes.

The invention also provides means for easily mounting and removing the rotor from the printer by means of a simple slide latch. A spring is provided for pushing the rotor off of the drive shaft when the latch is loosened.

The foregoing and other objects and advantages of the invention will be set forth in or apparent from the following description and drawings.

GENERAL DESCRIPTION

Figure 1:
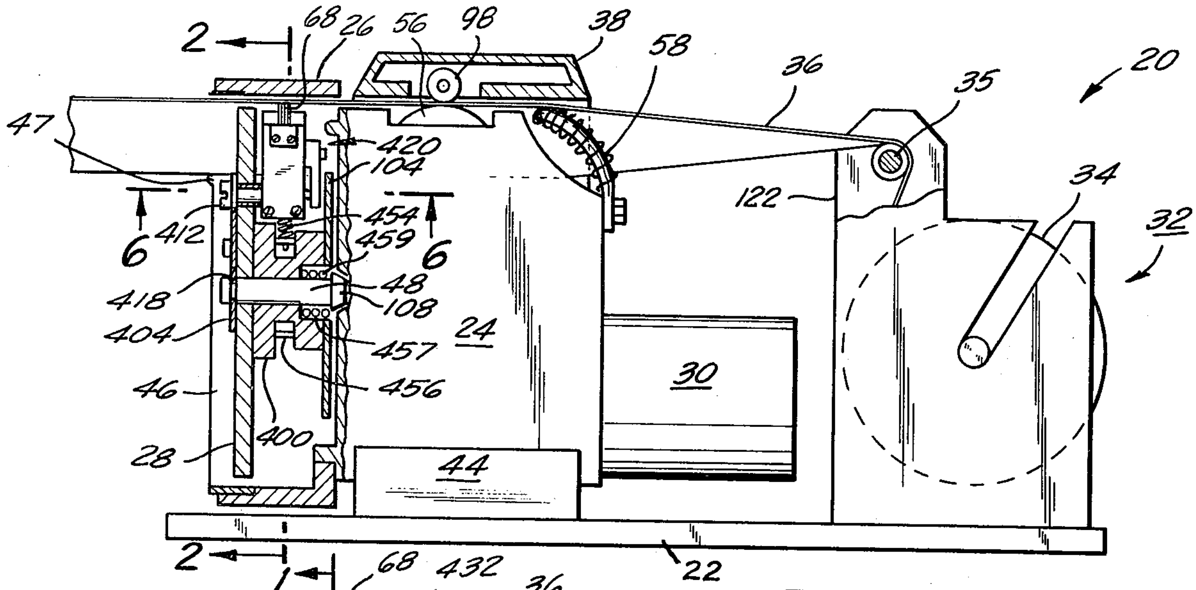
FIG. 1 is a side elevation view, partly in cross-section, of a printer utilizing the present invention.

FIG. 1 shows a rotary printer 20 which is substantially the same as the printer shown in the above-identified prior patent application, except for the structure at the left end of the printer. The printer 20 includes a base plate 22, a cylindrical housing 24, a cylindrical sleeve 26 which is used as a platen, a rotor 28 mounted on a drive shaft 48 so as to rotate in the sleeve 26, and a drive motor 30 for rotating the rotor 28. The housing 24 is supported on the base plate 22 by a curved mounting block 44.

Electrical discharge-sensitive paper 36 is stored in a roll 34 contained in a dispenser 32. The paper 36 passes upwardly from the roll 34 over a straight guide bar 35 towards a curved paper guide 38, which is shown in cross-section in FIG. 1. The guide 38 is hinged to the outer surface of the housing 24 (by means not shown) so that it can be raised easily to facilitate the insertion of the paper into the printer. A curved contact arm 58 makes electrical contact with the paper and helps form it into an arc.

A drive roller 56 is provided which pulls the paper from the roll 34 and draws it through the curved guide 38 so that the paper forms an arc, and feeds the paper through the sleeve 26 near its uppermost inside surface. After the printing has been formed on the undersurface of the paper 36, the paper emerges from the left edge of the sleeve 26. A paper tear ring 46 is provided at the left edge of the sleeve 26. The ring 46 has a serrated upper edge 47 to permit a length of the paper strip to be torn off easily.

Other details of the printer are more fully described in the above-identified pending patent application and will not be described in detail here. However, it is to be noted that two of the three photocells used in the prior printer for circumferential ajustment and timing of the operation of the styli can be eliminated because of the provision of mechanical adjustment by means of the present invention.

ROTOR CONSTRUCTION

Figure 2:
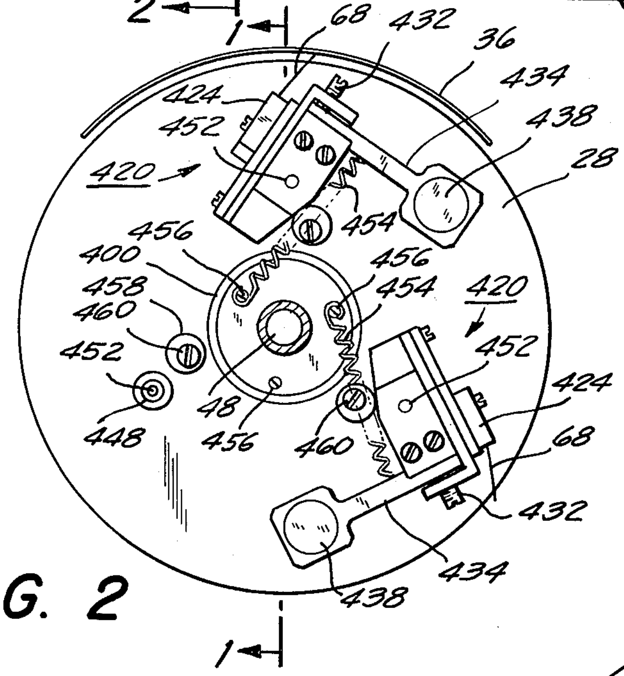
FIG. 2 is an elevation view, partly cross-sectional, taken along line 2—2 of FIG. 1.

Referring now to FIGS. 1 and 2, three stylus heads 420 are pivotably mounted on the inside surface of the rotor 28. Only two heads 420 are shown in FIG. 2, and only one of those heads is shown in FIG. 1, in order to maintain the clarity of the drawings.

Figure 4:
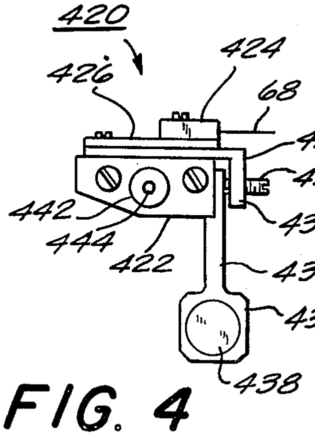
FIG. 4 is a side elevation view of one of the print heads of the printer shown in the preceding figures.
Figure 5:
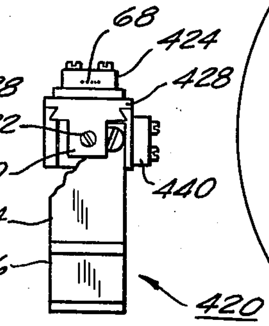
FIG. 5 is an end elevation view of the print head shown in FIG. 4.

Referring now to FIGS. 4 and 5, as well as to FIGS. 1 and 2, each stylus head includes five closely-spaced parallel stylus wires 68 which are molded into a stylus support 424. Electrical energy is distributed to the styli by means of a printed circuit panel 426 which is secured to the support 424. This assembly is secured to an L-shaped slide member 428. Member 428 slikes in a groove in a mounting block 422. An ajustment screw 432 is threadedly engaged with the depending lower portion 430 of the slide 428, and is rotatably engaged with the body 422. Thus, by turning the screw 432 the slide 428 is moved and the position of the styli 68 on the body can be adjusted.

Figure 6:
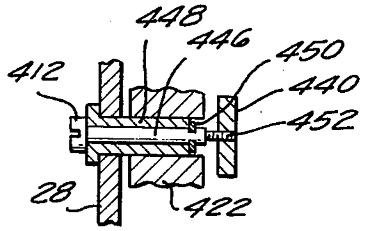
FIG. 6 is a cross-sectional, broken-away view of a portion of the FIG. 1 structure taken along line 6—6 of FIG. 1.

Each of the three stylus heads is pivotably mounted on the rotor 28 by means of a support structure which is shown in FIGS. 1 and 6 and will be described in greater detail below.

Each stylus head 420 has an arm 434 secured to the body 422 extending in a direction perpendicular to the direction of extent of the styli 68. At the end of the arm 434 is an enlarged hollow portion 436 which is filled with lead or contains a heavy metal insert 438. The insert 438 provides a relatively large mass for use in the centrifugal extension of the styli into engagement with the recording paper 36.

Referring now to FIG. 2, attached to each arm 434 is a tension spring 454 whose other end is attached to a pin 456 which extends parallel to the drive shaft 48. The point of connection between the spring 457 and the arm 434 is between the block 422 and the end 436 of the arm 434.

The foregoing structure operates to automatically retract the styli 68 away from the recording paper 36 when the speed of rotation of the rotor 28 drops below a pre-determined minimum speed, e.g. 500 revolutions per minutes or so. The tension springs rotate the print heads 420 about their pivot axis, indicated at 452 in a clockwise direction. This moves the styli away from the paper 36.

When the rotor 28 starts rotating, centrifugal force acts on the heavy inserts 438 at the ends of the arms 434, applies tension to the springs, and rotates the arms 434 counter-clockwise. When the desired speed has been reached, the styli 68 engage the surface of the recording paper 36.

A stop structure is provided so that an increase in rotational speed does not cause the styli 68 to press too hard against the paper 36. This stop structure consists of a cam 458 (FIG. 2) and a screw 460. The back edge of the body 422 of each print head engages the cam so as to stop the counterclockwise rotation of the print-head due to centrifugal force and stabilize the positions of the styli 68 at the desired location. This location can be varied by turning the screw 460.

ADJUSTMENT OF THE STYLI

The radial extent of the styli 68 can be adjusted, as it has been stated above, simply by turning the screw 432 in order to extend the styli radially outwardly or move them inwardly in order to adjust them, or in order to compensate for wear or dislocation of the initial positions of the styli.

Each of the stylus heads 420 also can be adjusted axially (in a direction parallel to the drive shaft 48) by means of the structure shown in detail in FIG. 6, and also in FIG. 1. An adjustment screw 412 is provided with its head on the outer surface of the rotor disc 28. The screw has a smooth shaft 446 which fits into and slides within a sleeve 448 which acts as a bearing, both for the shaft 446, and also for the inner surface of the block 422. As it is shown in FIG. 4, the block 422 is provided with a large hole 442 into which the sleeve 448 fits, and a small threaded hole 444 in a plate 440 (see FIG. 5) attached to one side of the stylus head.

Referring again to FIG. 6, the screw is held in place by means of a snap-ring 450 which fits into a groove in the end of the shaft 446. The shaft 446 has a threaded end 452 which fits into the threaded hole 444.

The adjustment of the head is made simply by inserting a screwdriver into the slot in the head 412 of the adjustment screw and turning it. This causes the distance between the block 422 and the disc 28 to change, thus providing axial alignment of each print head. This helps ensure that each of the characters in the printing produced by the printer will be properly spaced from the characters printed by each of the stylus heads.

ROTOR MOUNTING AND DISMOUNTING

The rotor 28 is mounted on the shaft 48 by means of the structure shown in FIG. 1. A hub 400 is provided. The rotor 28 is secured to the hub by means of four screw 402 (see FIG. 3). Secured to the other end of the hub 400 is the slip-ring disc 104 which makes electrical contact with the electrical circuitry of the printer, in the manner described in greater detail in the above-identified prior patent application. A stop member 108 is provided on the shaft.

The hub 400 has a central recess in which the pins 456 are located. These are the pins to which the springs 454 are attached.

Still referring to FIG. 1, the hub 400 has a recess 457 in its rear portion into which is inserted a compression spring 459. The compression spring bears against the stop member 108 and the hub 400 to thrust the rotor outwardly off of the shaft 48 and thus assist in removing it.

Figure 3:
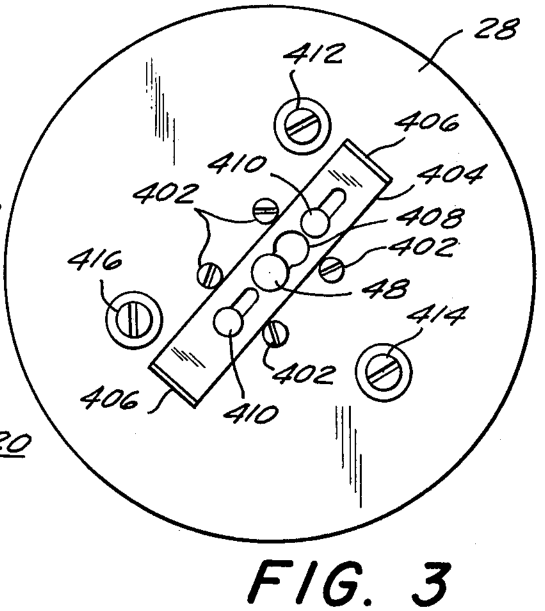
FIG. 3 is another elevation view of the rotor shown in FIGS. 1 and 2.

Referring now to FIG. 3, the rotor 28 is secured to the end of the drive shaft 48 by means of a latch mechanism. The latch mechanism includes a latch member or plate 404 with two perpendicular end tabs 406 against which one can press in order to slide the member 404. The member 404 is secured to the outer surface of the rotor 28 by means of a pair of rivets 410 which bear against the slide 404 in a pair of elongated slots. Bowed washers (not shown) are positioned between the rivet heads and the slide in order to ensure a constant frictional engagement between the slide and the surface of the rotor, thus holding the slide in the position to which it is moved.

The slide 404 has a slot with an enlarged opening 408 whose diameter is slightly larger than the end of the drive shaft 48. The drive shaft 48 has a circumferential groove 418 (see FIG. 1) into which the edges of the slide 406 in the slot fits in order to grip the end of the shaft 48.

Thus, simply by sliding the slide 406 downwardly, as shown in FIG. 3, the slide will release its engagement with the end of the shaft so that the disc can be removed. Then, the spring 459 pushes outwardly on the rotor and assists in removing it.

When replacing the rotor 28, the end of the shaft 48 is inserted through the hole 408, and the slide 404 is pushed upwardly to re-engage the slide with the end of the shaft and secure the rotor in place.

The above described invention fully meets the objectives set forth at the beginning of this specification. Whenever it is desired to remove the rotor from the printer, or whenever it is desired to start a new strip of recording paper through the printer, the styli 68 will not interfere because they are retracted and out of engagement with the recording paper. Furthermore, the printer reaches proper printing speed more quickly because the friction of the styli against the paper is absent until the desired minimum operating speed has been reached.

The device provides means for axially adjusting the styli without removing the rotor from the printer. This adjustment can be made simply by turning the screws 412 which are exposed at the open left end of the printer.

A simple mechanical means also is provided for adjusting the effective length of the styli, simply by turning the screws 432. This makes it easy to initially align the styli for producing printing which is properly aligned and easy to read.

The rotor is made very easy to remove by the provision of the simple slide latch shown in FIG. 3. The ease of removal is augmented by the use of the spring 459.

The above description of the invention is intended to be illustrative and not limiting. Various changes or modifications in the embodiments described may occur to those skilled in the art and these can be made without departing from the spirit or scope of the invention.

I claim:

1. In a rotary printer including a stylus, support means for supporting a recording sheet, means for creating rotary motion of said stylus and said support means relative to one another, and stylus positioning means for positioning said stylus near said support means to contact said sheet during said rotary motion, and for positioning said stylus away from said support means when the speed of said rotary motion is below a pre-determined level.

2. A device as in claim 1 in which said stylus positioning means comprises resilient bias means for urging said stylus away from said support means, and centrifugal means for urging said stylus towards said support means.

3. A device as in claim 2 including a plurality of styli arranged in groups around said rotor, and means for adjusting the axial distances of said groups from one another.

4. In or for a rotary printer, a rotor, a stylus, mounting means for movably mounting said stylus on said rotor with said stylus being movable between an outward recording position in which said stylus is in contact with a recording sheet, and an inward position in which said stylus is out of contact with said sheet, bias means for biasing said stylus towards said inward position, and centrifugal means responsive to centrifugal force for urging said stylus outwardly towards said recording position.

5. A device as in claim 4 in which said bias means comprises a spring connected between said rotor and a support for said stylus, and said centrifugal means comprises a weighted member connected to said spring to move outwardly against the bias of said spring under centrifugal force.

6. A device as in claim 5 including a support for said stylus, said mounting means comprising a shaft extending axially from said rotor said support being pivotably mounted upon said shaft, said spring being secured between a first point spaced from said shaft and a second point radially spaced from said first point.

7. A device as in claim 6 in which said centrifugal means comprises an arm extending outwardly from said first point, said weighted member being located adjacent the outer end of said arm.

8. A device as in claim 4 including a plurality of groups of styli spaced symmetrically about said rotor, each group having said bias means and said centrifugal means,

9. A device as in claim 4 including a stylus support, means for movably securing said stylus to said support, and means for adjusting the outward extent of said stylus on said support in order to compensate for changes in the length and/or position of said stylus.

10. A device as in claim 8 in which said styli are elongated, electrically conductive resilient members for electrical discharge recording, and extend at an acute angle with respect to said recording sheet, and stop means for adjustably limiting the outward extent of said styli under the influence of centrifugal force.

11. A device as in claim 10 in which said stop means comprises a cam and means for rotating said cam to provide a stop surface of variable extent.

12. In a rotary electrical discharge printer including a rotor, means for rotating said rotor, a plurality of angularly-spaced styli heads secured to said rotor, feed means for moving electrical discharge-sensitive paper past said rotor in a direction transverse to the direction of rotation of said rotor with said styli contacting said paper, each of said heads including a plurality of axially-spaced styli, and means for axially adjusting the positions of said styli relative to said rotor to align the images produced by adjacent styli heads.

13. A device as in claim 6 which prints characters by forming them from dots, there being, in each of said heads, the same number of styli as required to form all of the dots in one of the horizontal and vertical portions of each of said characters so that one pass of a head over said paper will be capable of producing at least one printed character on said paper.

14. A device as in claim 13 in which alphabetic characters are printed to form words, said paper having the form of an elongated strip, said feed means being adapted to move said strip longitudinally past said rotor, the styli in each head being spaced apart by the desired distance between dots in the printed characters, electrical control means for causing said words to be formed longitudinally on said strip, the number of characters formed in said word during each revolution of said rotor being equal to the number of styli head on said rotor.

15. A device as in claim 12 in which said rotor is a disk, and said adjusting means comprises threaded members extending through said disk, bearing means for supporting each threaded member in said disk to allow it to rotate with respect to said disk, the threads of each threaded member engaging a threaded hole in one of said heads.

16. In a rotary electrical discharge printer including a rotor, means for rotating said rotor, a plurality of angularly-spaced styli heads secured to said rotor, feed means for moving electrical discharge-sensitive paper past said rotor in a direction transverse to the direction of rotation of said rotor with said styli contacting said paper, each of said heads including a plurality of axially-spaced styli, each of said heads including a mounting block mounted on a shaft extending from said rotor, and a stylus support member slidably mounted on said block, and threaded adjustment means for sliding said stylus support member radially of said rotor to adjust for changes in length and/or position of said styli.

17. A device as in claim 16 including means for axially adjusting the positions of said styli relative to said rotor to align the images produced by adjacent styli heads.

18. In a rotary electrical discharge printer including a rotor, means for rotating said rotor, a plurality of angularly-spaced styli heads secured to said rotor, feed means for moving electrical discharge-sensitive paper past said rotor in s direction transverse to the direction of rotation of said rotor with said styli contacting said paper, each of said heads including a plurality of axially-spaced styli, said rotor comprising a disk, said rotating means including a drive shaft with a circumferential groove adjacent one end, a latch member having a longitudinal slot enlarged at one end to form a hole of a diameter greater than the outside diameter of said shaft, said disk having a central hole, and means for slidably mounting said latch member on one side of said disk with said slot enlargement movable towards and away from said hole in said disk to engage the edges of said latch member at said slot in said groove of said shaft, whereby said rotor is easily removed from and replaced in said printer.

19. A device as in claim 18 including a hub on the side of said disk opposite said one side, means for drivably engaging said shaft with said hub, a stop member on said shaft adjacent one end of said hub, a recess in said one end of said hub, and a compression spring in said recess to urge said rotor off of said drive shaft to further facilitate removal of said rotor from said drive shaft.

* * * * *

UNITED STATES PATENT AND TRADEMARK OFFICE

CERTIFICATE OF CORRECTION

PATENT NO. : 3,998,315

DATED : December 21, 1976

INVENTOR(S) : Darwin E. Phillips

It is certified that error appears in the above-identified patent and that said Letters Patent are hereby corrected as shown below:

Column 2, line 62, change "slikes" to --slides--.

Column 6, line 20, change "6" to --12--.

Signed and Sealed this

Twenty-eighth Day of June 1977

[SEAL]

*Attest:*

RUTH C. MASON
*Attesting Officer*

C. MARSHALL DANN
*Commissioner of Patents and Trademarks*